J. T. DALTON.
KNOT TIER.
APPLICATION FILED NOV. 26, 1912.

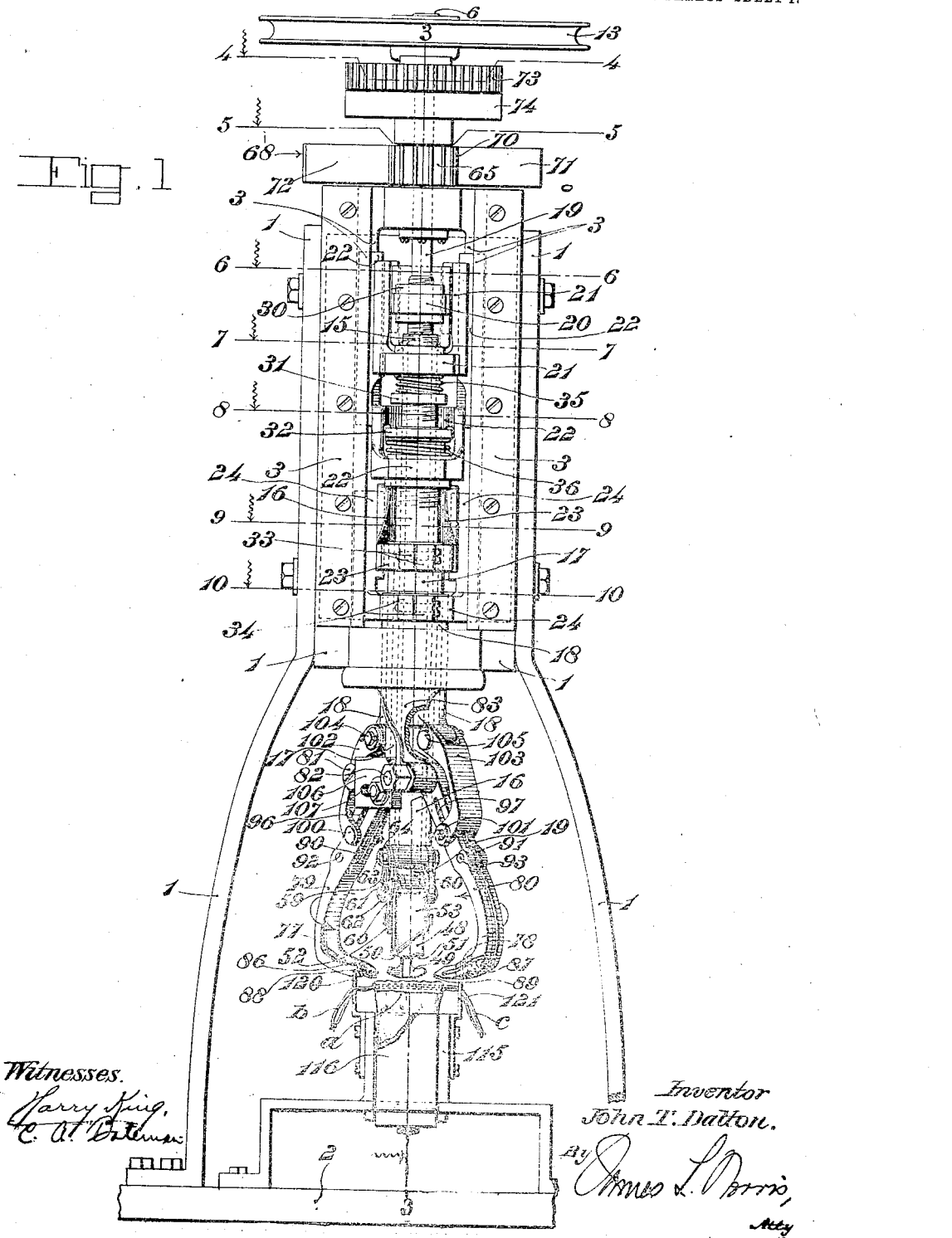

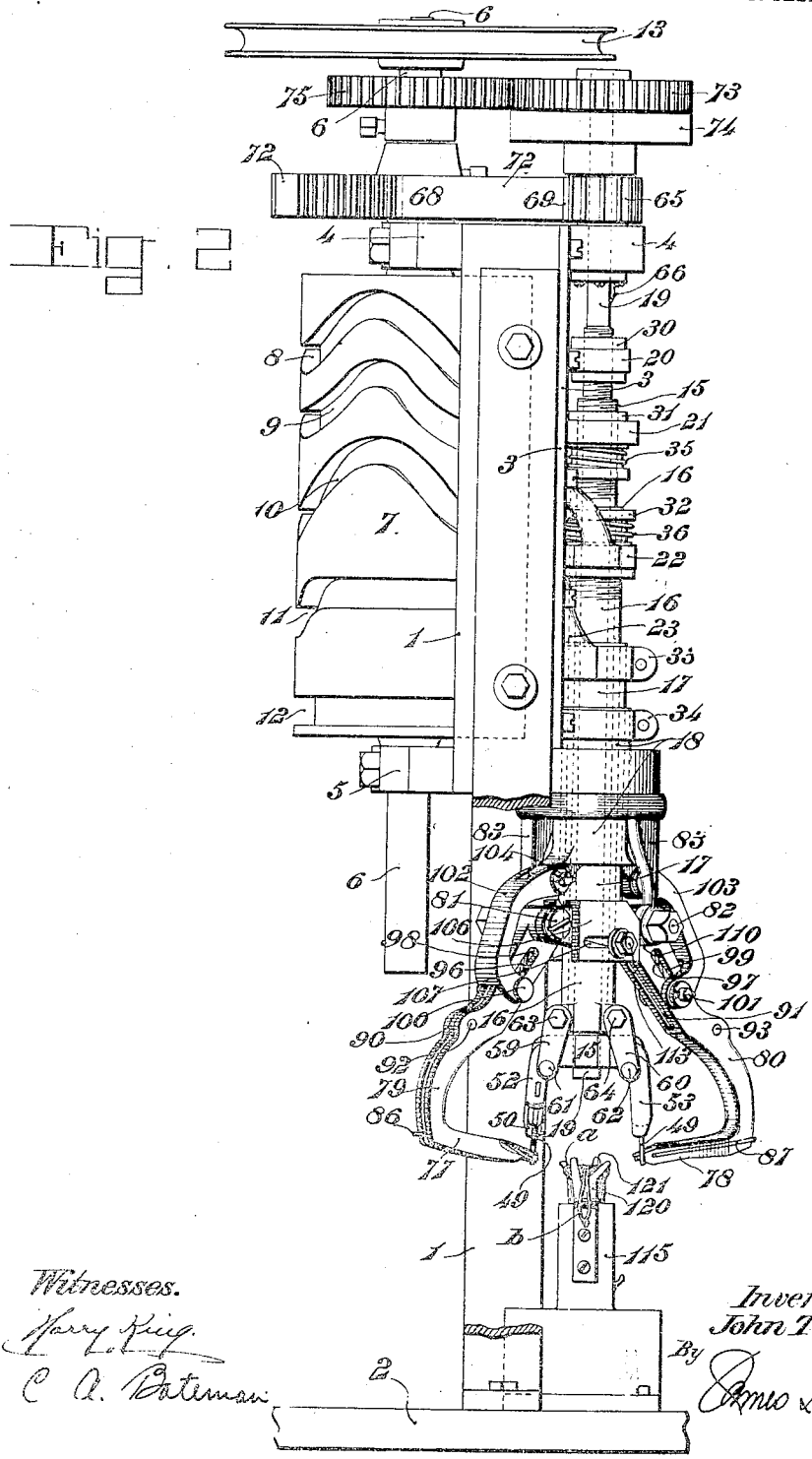

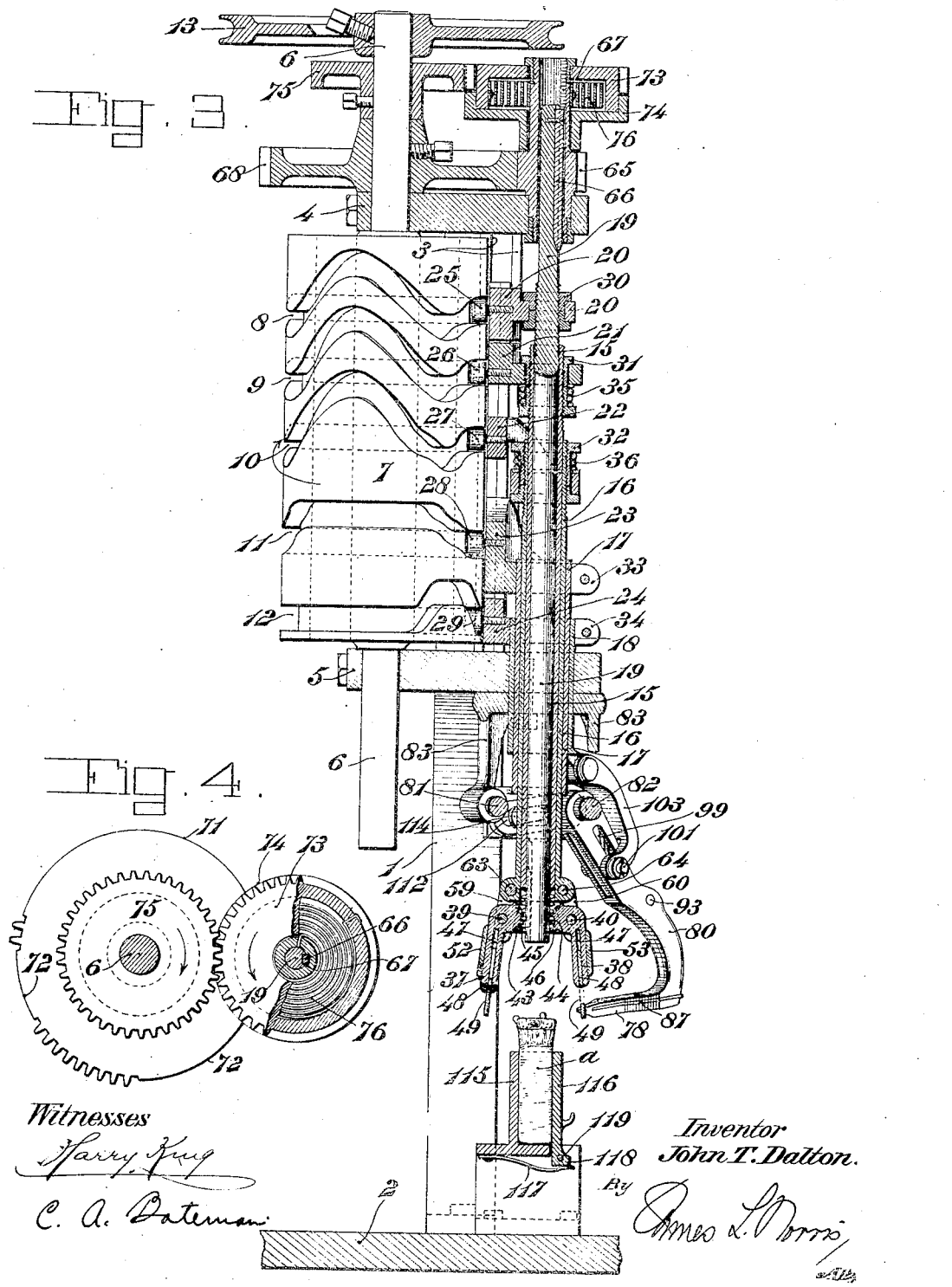

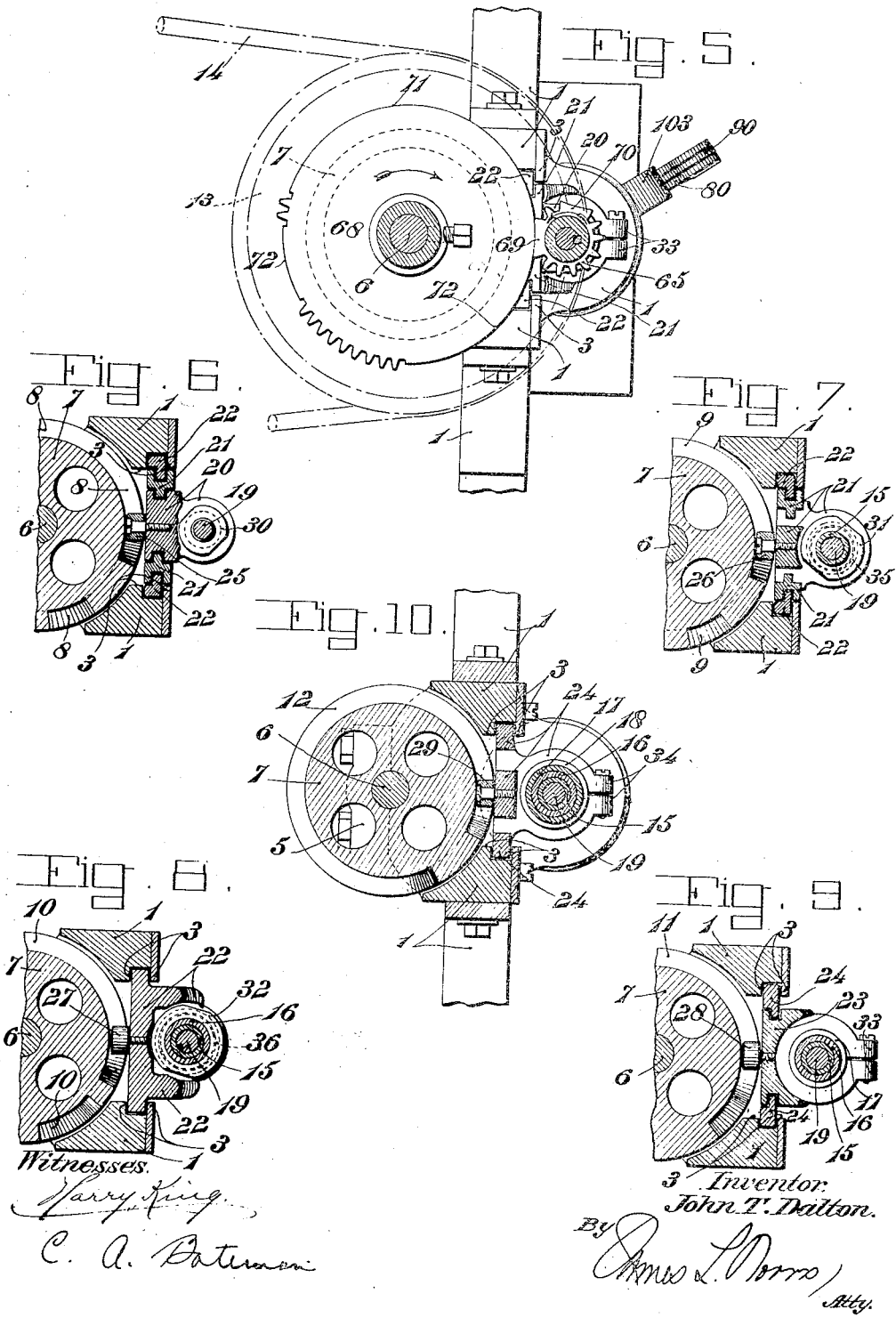

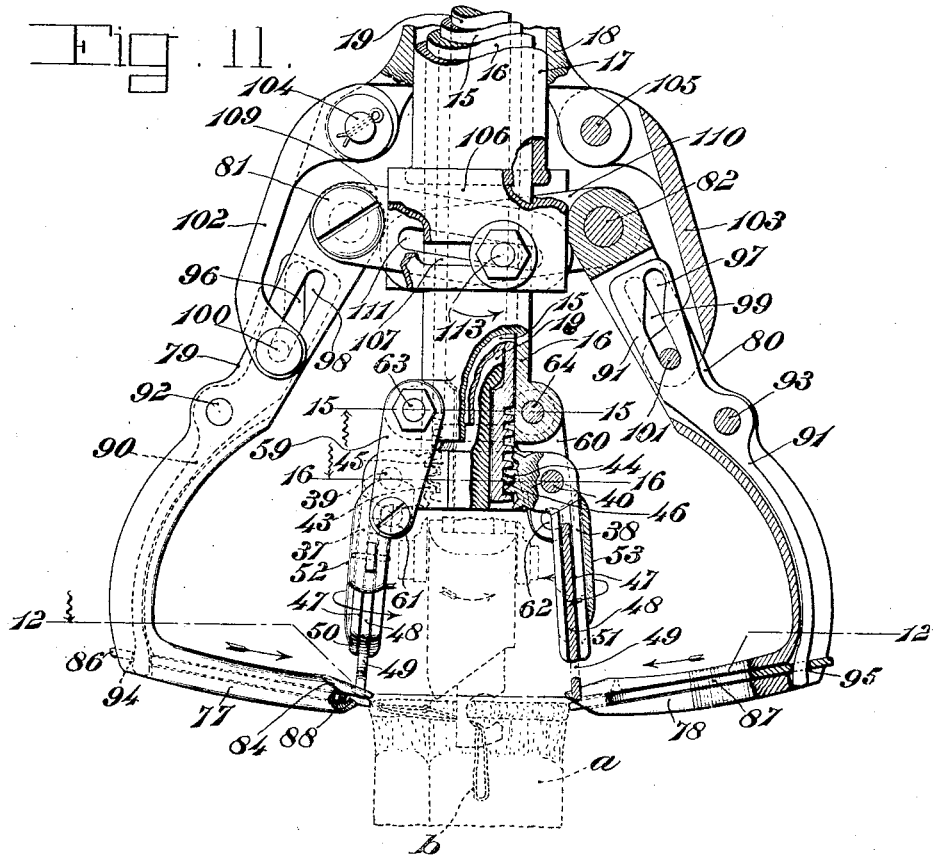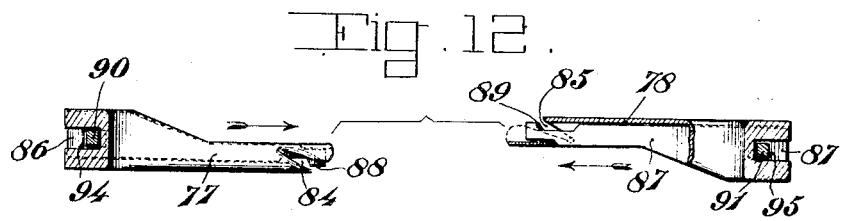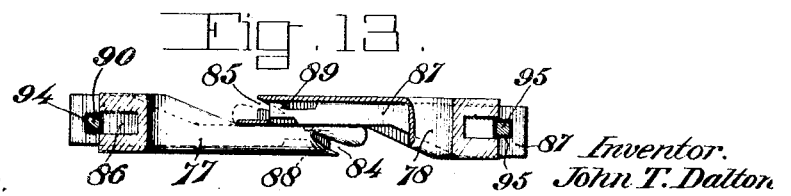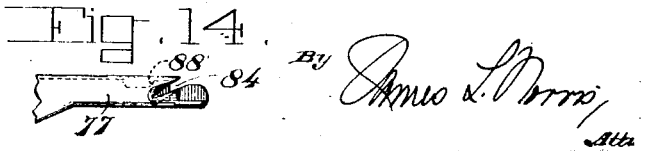

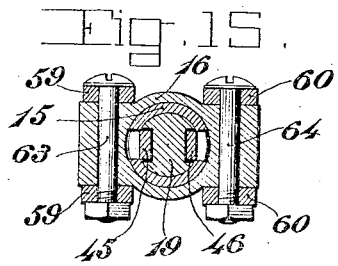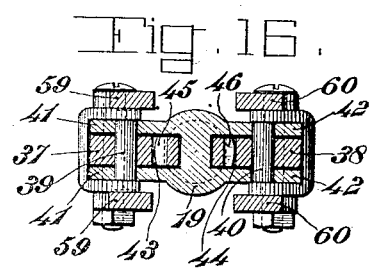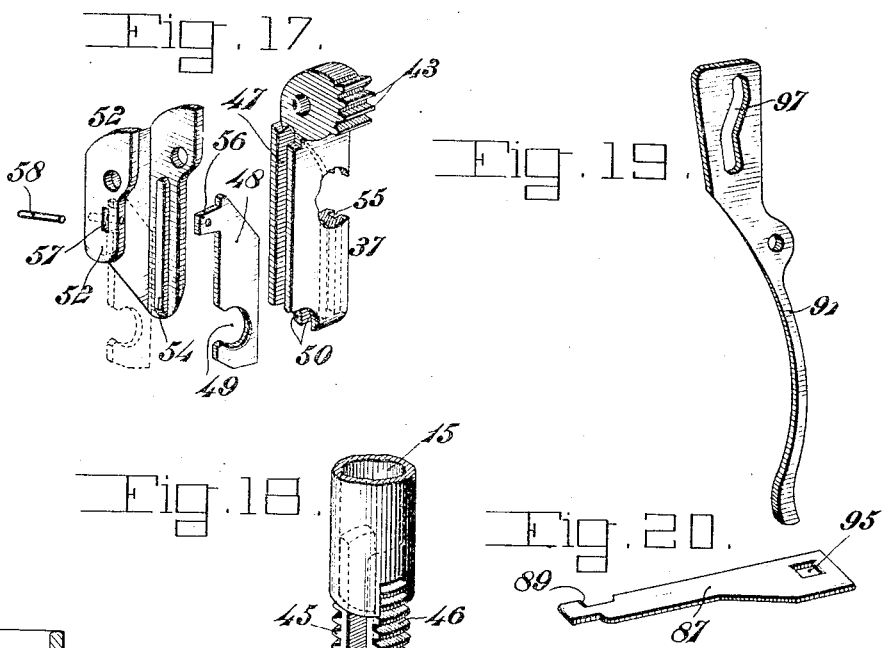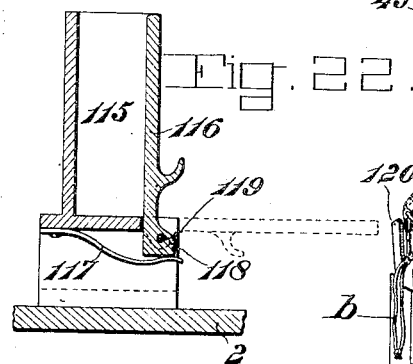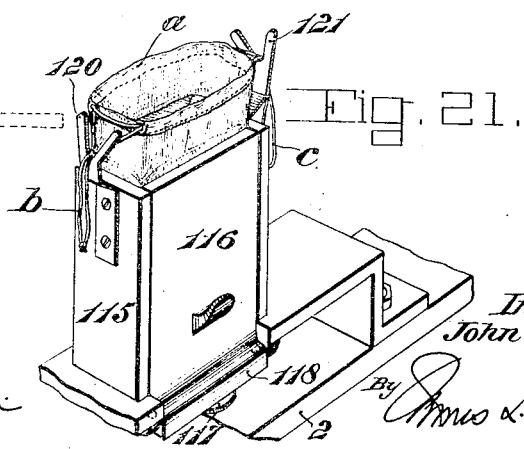

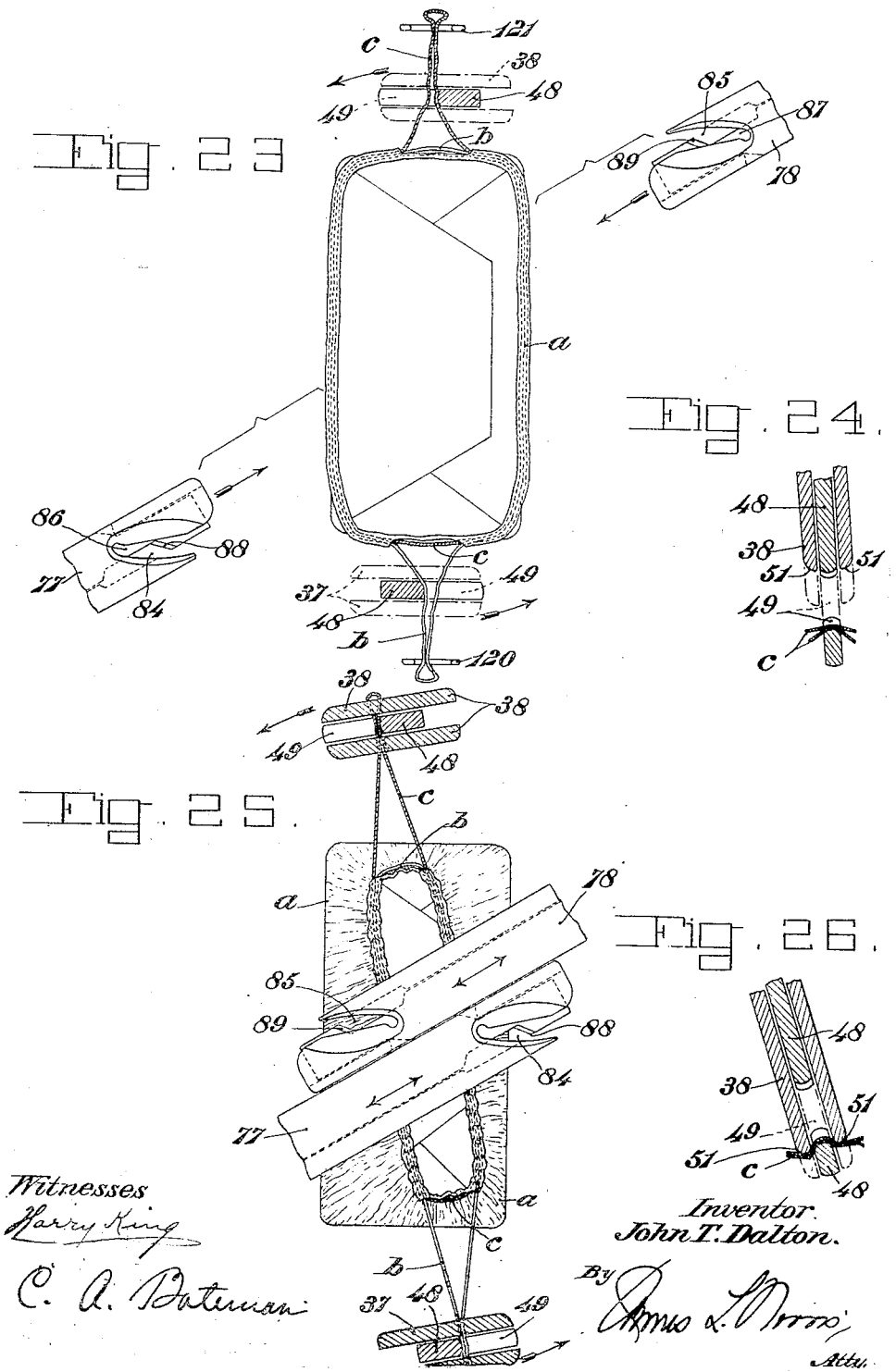

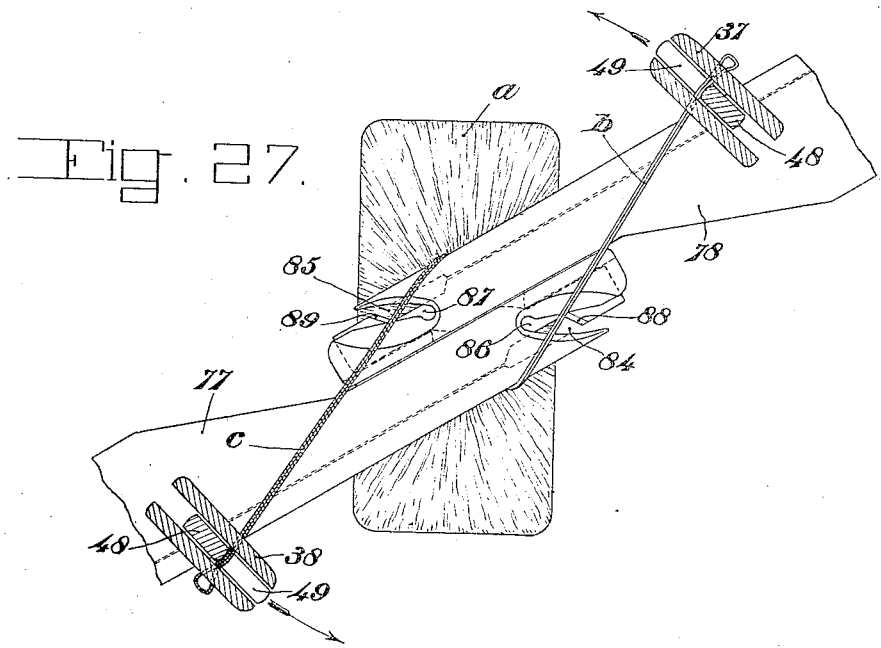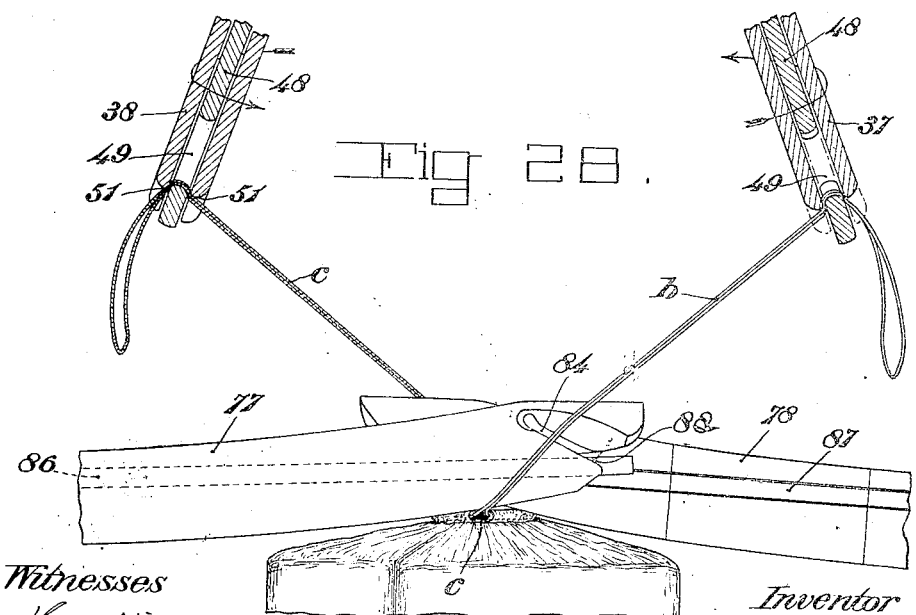

1,125,666.

Patented Jan. 19, 1915.
10 SHEETS—SHEET 10.

Witnesses.
Harry King.
C. A. Bateman.

Inventor.
John T. Dalton.
by James L. Norris
Atty.

UNITED STATES PATENT OFFICE.

JOHN T. DALTON, OF BALTIMORE, MARYLAND, ASSIGNOR TO RICHARD H. WRIGHT, OF DURHAM, NORTH CAROLINA.

KNOT-TIER.

1,125,666.   Specification of Letters Patent.   Patented Jan. 19, 1915.

Application filed November 26, 1912. Serial No. 733,713.

*To all whom it may concern:*

Be it known that I, JOHN T. DALTON, a citizen of the United States, residing at Baltimore city, in the State of Maryland, have invented new and useful Improvements in Knot-Tiers, of which the following is a specification.

The present invention relates to improvements in knot tiers, and the primary object thereof is to provide an improved apparatus or machine which is capable of operating rapidly, automatically and with certainty to tie the knots.

In the present embodiment of the invention, the apparatus is especially adapted to draw taut and to tie the strings such as used commonly on tobacco bags, it being only necessary for the operator or attendant to position the bag before the devices which draw the strings taut and which form the knot, the operations being all performed by the apparatus automatically or without assistance from the attendant.

To these and other ends, the invention consists in certain improvements, and combinations and arrangements of parts, all as will be hereinafter more fully described, the novel features being pointed out particularly in the claims at the end of the specification.

Figure 29:
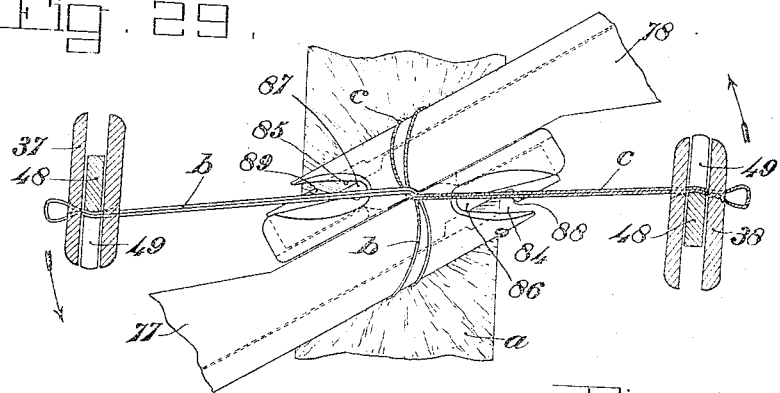
Figure 30:
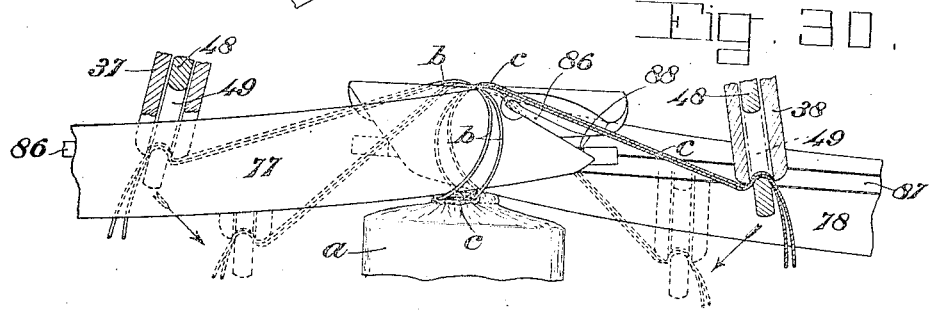
Figure 31:
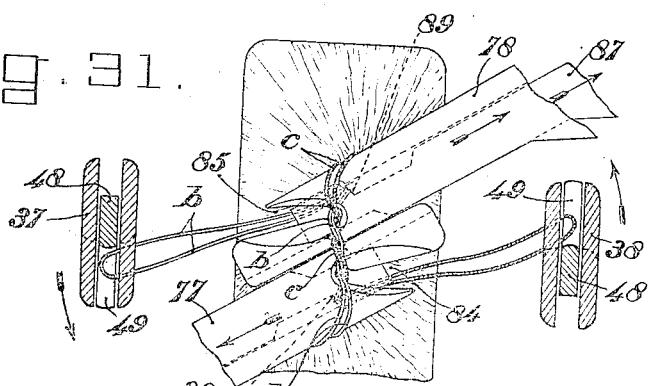
Figure 32:
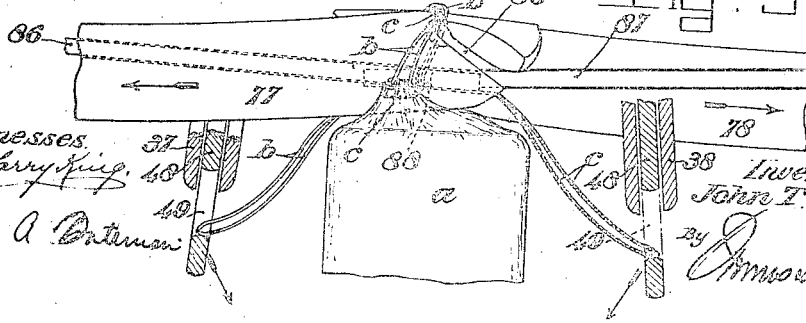
Figure 33:
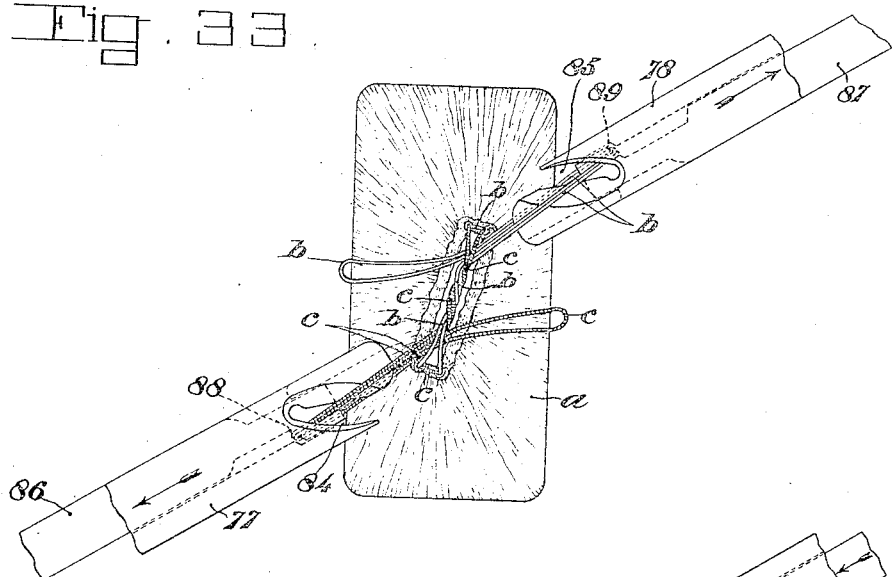
Figure 34:
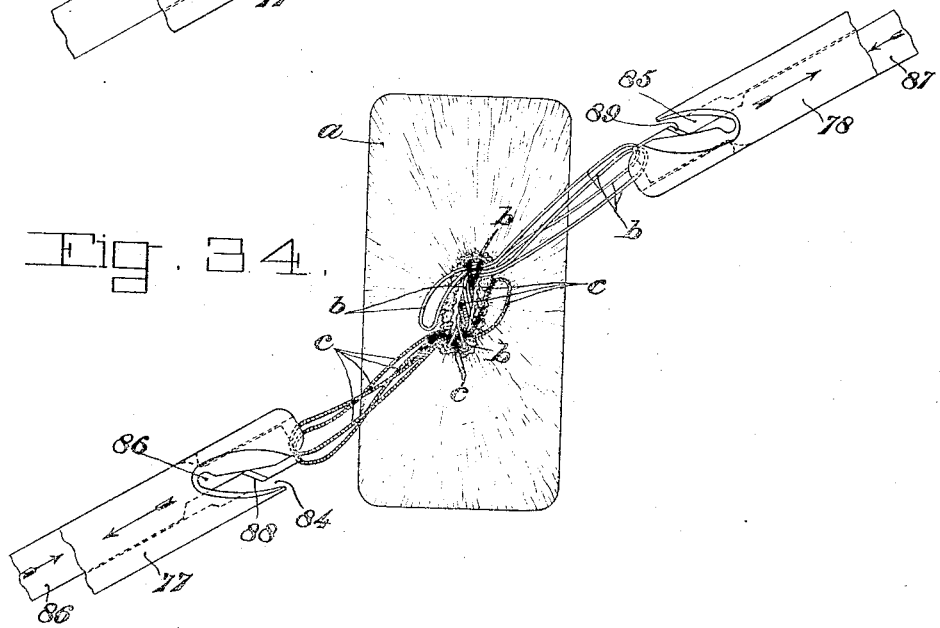

In the accompanying drawings:—Figure 1 is a front elevation of a knot-tying apparatus constructed in accordance with the present invention; Fig. 2 is a side elevation of the same as viewed from the left in Fig. 1; Fig. 3 represents a central vertical section on the line 3—3 of Fig. 1 and looking in the direction of the arrow; Figs. 4–10 represent transverse sections on the lines 4—4, 5—5, 6—6, 7—7, 8—8, 9—9 and 10—10 respectively of Fig. 1; Fig. 11 is a detail view, on an enlarged scale, of the coöperating devices which draw the strings taut and form the knot; Fig. 12 represents a section on the line 12—12 of Fig. 11 showing the knot-forming fingers in separated relation; Fig. 13 is a view similar to Fig. 12 showing the knot-forming fingers after they have been brought together, the grippers in this figure being shown closed; Fig. 14 shows in detail the under side of one of the knot-forming fingers; Figs. 15 and 16 represent sections on the lines 15—15 and 16—16 respectively of Fig. 11; Fig. 17 is a view showing in detail the elements composing one of the grippers which serve to draw the strings taut and to loop them over the knot-forming fingers; Fig. 18 is a detail perspective view of the lower end of the sleeve which operates the grippers; Figs. 19 and 20 are detail perspective views respectively of the lever and gripper blade for one of the knot-forming fingers; Fig. 21 is a detail perspective view of the holder which receives and positions the bag while the strings thereof are being operated on; Fig. 22 is a sectional view of the bag holder showing in dotted and full lines respectively the open and closed positions of the door thereof; Fig. 23 is a diagrammatic view showing the relative positions of the parts at the commencement of operations, the grippers for the strings having moved into positions to receive the strings on the bag and the knot-forming fingers beginning to move into operative position; Fig. 24 is a detail sectional view of the lower end of one of the grippers indicating the manner in which the same receives the corresponding string of the bag; Fig. 25 is a view similar to Fig. 23 and illustrating the next step in the operation, the grippers separating relatively to one another to draw the strings on the bag taut and thereby substantially close the bag and also beginning to rotate, the knot-forming fingers having moved into operative position above the bag; Fig. 26 is a view similar to Fig. 24 showing one of the strings gripped by its respective gripper; Fig. 27 shows a further stage in the rotation of the grippers at which point the looping of the strings over the knot-forming fingers is commenced; Fig. 28 is a view showing the grippers and knot-forming fingers in elevation, the position of the parts corresponding to that shown in Fig. 27; Fig. 29 shows the grippers after they have completed their rotary movement, the strings being completely looped over the fingers and their ends held by the grippers; Fig. 30 is an elevation showing the parts in full lines in the same relative position as shown in Fig. 29, and the dotted lines showing the next operation of the grippers which is in a direction inwardly and downwardly to cause the ends of the strings to be engaged by the gripping blades of the knot-forming fingers; Fig. 31 shows the parts at the moment the ends of the strings are released by the grippers, and the knot-forming fingers begin the operation of drawing the ends of the strings through the loops therein; Fig. 32 represents an elevation of the parts in the same relative position as shown in Fig. 31; Fig. 33 shows diagrammatically the operation of the fingers to tighten the knot; Fig. 34 shows diagrammatically the last operation of releasing the strings after the knot has been completely formed.

Similar parts are designated by the same reference characters in the several views.

Knot-tying apparatus embodying the present invention is capable of a variety of uses and it will be within the skill of those versed in the art to adapt the apparatus according to the different requirements or conditions. The invention is especially adapted to be used for the purpose of drawing taut and tying the strings as commonly used on tobacco bags, and a construction which is well adapted to perform these operations is illustrated in the accompanying drawings and will be hereinafter described in detail. It is to be understood, however, that I have shown but one embodiment of the invention, and that equivalent constructions will be included within the scope of the claims at the end of the specification.

The apparatus shown in the present instance comprises a suitable frame 1 mounted on a base 2 and provided with guides 3 between which certain parts of the mechanism operate.

The frame is provided with bearings 4 and 5 which support a main drive shaft 6, the latter having a drum 7 fixed thereto which, in the present instance, is formed with a series of cam grooves 8, 9, 10, 11 and 12. The drive shaft is adapted to rotate continuously and may be driven by a pulley or wheel 13 and a coöperating belt 14 or other suitable means. A set of tubular shafts or sleeves 15, 16, 17 and 18 arranged concentrically and in telescoped relation are provided, and a central shaft 19 also operates within the innermost sleeve or hollow shaft 15, these different shafts serving to operate the devices which perform the operations of drawing the strings taut and tying the same into a knot. These different shafts are capable of reciprocating axially, one within the other, and also the shafts 15 and 19 are capable of rotating within the other shafts to perform certain operations which will be hereinafter described. A set of cross-heads 20, 21, 22, 23 and 24 are mounted to slide vertically or longitudinally between the guides 3, these cross-heads being provided with rollers or projections 25, 26, 27, 28 and 29 respectively which coöperate within the corresponding cam grooves 8, 9, 10, 11 and 12. The cross-head 20 coöperates with a collar 30 which is fixed to the shaft 19 in a manner which enables the cross-head to shift this shaft axially under the influence of the cam groove 8, although permitting rotation of the shaft 19. The cross-head 21 coöperates with a collar 31 which is fixed to the tubular shaft or sleeve 15 whereby the cross-head 21 will reciprocate the shaft 15 axially under the influence of the cam groove 9, although the shaft 15 may rotate relatively to said cross-head. The cross-head 22 coöperates with a collar 32 which is fixed to the hollow shaft or sleeve 16 in such a manner that said cross-head will shift the hollow shaft or sleeve 16 in an axial direction under the influence of the cam groove 10, although the shaft 16 may rotate relatively to said cross-head. The cross-heads 23 and 24 are connected to the hollow shafts or sleeves 17 and 18 respectively, and in the present instance they are so secured by clamps 33 and 34. Preferably, springs 35 and 36 are interposed between the cross-heads 21 and 22 and their respective collars 31 and 32 for the purpose of subjecting the strings to the proper degree of tension and to avoid undue tension that would be liable to break the strings during certain operations as will be hereinafter described.

The lower end of the innermost shaft 19 supports a pair of grippers which operate to grip the strings, draw them taut, and to loop the strings over the knot-forming fingers. In the present instance, these grippers embody a pair of arms 37 and 38 which are pivotally mounted at their upper ends on the pivot pins or bolts 39 and 40, the arms operating between the forks 41 and 42 which project from opposite sides of the shaft, and the inner portions of the arms are formed with gear segments 43 and 44. The lower end of the hollow shaft or sleeve 15 is formed with a pair of racks 45 and 46 which are guided to reciprocate between the forks 41 and 42 respectively on the shaft 19 and coöperate with the gear segments 43 and 44 of the respective gripper arms 37 and 38, relative axial movement between the shafts 15 and 19 causing the gripper arms 37 and 38 to swing inwardly or outwardly, as the case may be, and about their pivots as axes. Each gripper arm is formed with a longitudinal slot 47 in which a blade or gripper member 48 may reciprocate, this blade having a recessed hook-shaped jaw 49 adapted to receive one of the strings.

The lower corners of the arms 37 and 38 of the gripper members are preferably formed with cut-out portions 50 and 51 which, when the respective blades are lowered, will permit the strings to enter the recesses or openings of the respective hook-shaped jaws, and when the gripper blades or members are retracted will coöperate with the hook-shaped jaws to grip or clamp the respective strings. In the present instance, slides 52 and 53 are mounted to operate longitudinally on the respective gripper arms 37 and 38, each slide being guided on the respective gripper arm by a rib 54 which coöperates with a groove 55 on the respective arm, and each gripper blade or member is provided with a lug 56 which engages in a slot 57 of the respective slide and a pin 58 may be used to fasten these parts together whereby relative reciprocating movement between the slides and the respective gripper arms will cause corresponding movements of the gripper blades to clamp or release the strings at the proper times.

In the present instance, the slides 52 are operated by pairs of links 59 and 60 which are pivotally connected at 61 and 62 to the respective slides, and these links are also pivotally connected at 63 and 64 to the lower end of the tubular shaft or sleeve 16.

From the foregoing description it will be understood that relative axial movement between the shafts 15 and 19 will cause the grippers to swing in a direction inwardly or outwardly, and relative axial movement between the shaft 16 and the shafts 15 and 19 will cause opening and closing of the grippers. These three shafts just mentioned are also capable of rotation in unison, and in the present instance, such rotary movement is imparted to the shafts by a pinion 65 which is splined to the shaft 19 by the key 66 which slides in a keyway 67 formed in the hub of the pinion. The pinion 65 coöperates with a gear wheel 68 which is fixed to the main drive shaft 6. During the operation of the machine, the main drive shaft 6 revolves continuously while the shafts 15, 16 and 19 pause at certain periods in their rotation. In order to provide for this, the pinion 65 and the gear 68 are preferably in the form of a Geneva movement, as shown more particularly in Fig. 5, the pinion 65 having two rests 69 and 70 which are suitably spaced circumferentially, while the gear 68 has two untoothed portions 71 and 72 which coöperate respectively with the rests 69 and 70 of the pinion. In order to minimize or relieve shock between the pinion 65 and gear 68 upon the commencement of each movement of the shaft 19 and at the moment the gear teeth on the gear 68 reach the rests 69 and 70 respectively of the pinion, a shock absorber may be used, that shown embodying a gear 73 which is loosely mounted on the hub of the pinion 65 and is supported by a bearing 74, the gear 73 coöperating with a gear 75 which is fixed to the main drive shaft 6, and a coil spring 76 which is housed in the gear 73 has its ends attached respectively to the gear 73 and to the hub of the pinion 65, the gears 75 and 73 revolving continuously, and during the pauses in the rotation of the pinion 65 the spring 76 will be tensioned and the tension on this spring will tend to rotate the pinion 65 and hence the spring will serve to resume rotation of the pinion 65 when the ends of the smooth or untoothed portions 71 and 72 of the gear 68 reach the rests 69 and 70 respectively of the pinion.

A pair of knot-forming fingers 77 and 78 are provided which in the present instance operate as forms about which the strings are looped, and also as grippers to draw the ends of the strings through the loops and thus tie the knot. These knot-forming fingers in the present instance are attached to a pair of arms 79 and 80, these arms being pivoted at 81 and 82 to a bracket 83 fixed to the frame 1 whereby said arms may swing to and from an operative position over the bag. The inner or adjacent ends of the knot-forming fingers are provided with slots or openings 84 and 85 and which extend diagonally, and when the fingers occupy an operative position above the bag these slots are substantially in alinement, as shown in Fig. 13. Gripping blades 86 and 87 are slidably mounted in the respective fingers and are provided with jaws 88 and 89 which are adapted to receive the strings when the gripping blades are in one position and to clamp or grip the strings when such blades are moved into operative position, the strings being then gripped between the jaws on the blades and the walls of the slots 84 and 85. Different means may be provided for reciprocating the gripping blades at appropriate intervals, the arms 79 and 80 in the present instance being slotted and containing levers 90 and 91 which are pivoted to said arms at 92 and 93, the lower portions of the levers operating in openings 94 and 95 of the respective gripper blades, and the upper portions of the levers are formed with cam slots 96 and 97. The upper portions of the arms 79 and 80 are also formed with rectilinear slots 98 and 99, and pins 100 and 101 are arranged to reciprocate in each pair of slots, the shape of the cam slots causing rocking movements of the levers 90 and 91 and such movements of the levers causing reciprocation of the respective gripper blades into positions to grip and release the strings. Reciprocation of the pins 100 and 101 to effect the purposes described is caused in the present instance by a pair of links 102 and 103 which are pivotally connected at 104 and 105 to the outermost tubular shaft 18, reciprocation of said shaft being produced by the cross-head 24 under the influence of the cam groove 12. The hollow shaft 17 carries a head 106 which is formed with slots 107 and 108, and arms 109 and 110 which coöperate with the arms 79 and 80 respectively and are formed with slots 111 and 112, bolts 113 and 114 extending through the respective pairs of slots and forming an operative connection between the shaft 17 and the arms 109 and 110, and axial reciprocation of the shaft 17 under the influence of the cam groove 11 will serve to swing the arms 79 and 80 to and from operative position about the pivots 81 and 82 as axes. The extent of movement of the arms 79 and 80 can be readily varied by adjusting the bolts 113 and 114 relatively to the pivots 81 and 82.

In the present instance, the base of the machine is provided with a holder 115 for the bags, this holder conforming substantially to the size and shape of the bags to be handled and preferably having a hinged door or side 116 whereby the bags may be readily inserted and removed. In order to retain the door in closed position and also to properly retain the bag in the holder, a spring 117 may be used which coöperates with a projection 118 located adjacent to the pivot 119 of the door. The two ends of the bag holder may also be provided with forks 120 and 121 to support the out-stretched strings of the bag until such strings are received by the grippers.

The machine shown and described in the present embodiment of the invention is particularly adapted to tie the strings as used commonly on tobacco bags, the bag *a* being provided at the mouth with two strings *b* and *c* which are in the form of loops and portions of these strings project from opposite sides of the bag, pulling upon these strings operating in the well known way to contract and close the bag. In shipping bags of tobacco of this kind, the strings are tied into knots to retain the bags in closed condition.

The operation of the machine shown in the present instance may be briefly described as follows:—In Figs. 1, 2 and 3, the parts are shown in the positions they occupy normally, that is to say, before the commencement of the operations. The bag with its contents therein is placed in the holder 115 with the mouth of the bag open and the ends of the strings *b* and *c* extended outwardly and over the supports 120 and 121. Assuming that rotary movement is imparted to the main drive shaft 6, and the pulley or wheel 13, the first step involves a partial rotation of the shafts 15, 16 and 19 which carry the grippers and their operating devices, these grippers in the present instance rotating from the position shown in Figs. 1, 2 and 3 and in the full lines in Fig. 11, to the dotted line position shown in Fig. 11, there then being a pause in the rotation of the grippers. This rotation of the grippers is effected by the interrupted gear 68, the pinion 65 being turned from a position where the rest 69 coöperates with the untoothed portion 71 of the gear 68 to a position where the rest 70 of the pinion coöperates with the untoothed portion 72 of the gear 68. When the grippers have been rotated as described, they are in positions to receive the respective strings in the hook-shaped jaws thereof, and during the pause in the rotation of the grippers the cam 10 operates to draw up the tubular shaft 16 and thereby close the grippers upon the strings, and at the same time the cam 11 operates to raise the tubular shaft 17 and thereby move the knot-forming fingers 77 and 78 from the position shown in Figs. 1 and 2 and diagrammatically in Fig. 23 to an operative position above the bag, as shown diagrammatically in Fig. 25. The grippers then resume their rotary motion through the engagement of the toothed portions of the pinion 65 and gear 68, and concurrently with the rotary motion of the grippers, these grippers are swung outwardly or in a direction away from one another to draw the strings on the bag taut and the grippers also rise bodily in order to loop the strings over the knot-forming fingers. The outward or separating movement of the grippers is accomplished by a relative axial movement between the hollow shaft 15 and the innermost shaft 19 under the influence of the respective cam grooves 8 and 9, while the upward movement of the grippers is accomplished by a raising of the shafts 15, 16 and 19 owing to the contours of the cam grooves 8, 9 and 10, the grippers then traveling in a path which will clear or pass above the knot-forming fingers 77 and 78, and as these grippers rotate in the manner indicated in Figs. 27 and 28, the strings will be not only drawn taut to close the mouth of the bag, but the strings will be looped over the knot-forming fingers 77 and 78. Fig. 28 shows the grippers in elevated position so as to pass above the knot-forming fingers. Continued rotation of the grippers returns them to their initial or starting position, as shown in Fig. 29, rotation of the fingers being then interrupted by reason of the engagement of the rest 69 of the pinion 65 with the untoothed portion 71 of the gear 68, and when the grippers have reached this position, the two strings have been completely looped over the knot-forming fingers 77 and 78, as shown in Fig. 29, and the ends of the strings are crossed. The grippers then move in a direction downwardly and inwardly or toward one another as indicated diagrammatically in Fig. 30, this movement of the grippers being effected by relative axial movement between the shafts 19 and 15 owing to the contours of the respective cam grooves 8 and 9. This downward and inward movement of the grippers carries the ends of the strings *b* and *c* into the slots 84 and 85 of the respective knot-forming fingers 77 and 78, whereupon the shaft 18 moves upwardly relatively to the shaft 17, and the levers 90 and 91 are rocked in a direction to cause the gripper blades 86 and 87 in these fingers to grip the respective strings, and at the same time the knot-forming fingers 77 and 78 are retracted or moved apart, as indicated by the arrows in Figs. 31 and 32, the grippers being simultaneously opened, as shown in these figures, to release the strings. As the knot-forming fingers 77 and 78 move outwardly or away from one another, they pull the ends of the strings engaged thereby through those portions of the strings which will loop over the knot-forming fingers, thereby tying the strings into a slip knot, the tension produced on the ends of the strings serving to tightly close the mouth of the bag, whereupon the gripper blades 86 and 87 are shifted inwardly or in the directions indicated by the arrows in Fig. 34, thereby releasing the strings. The ends of the strings $b$ and $c$ will be in the form of short loops $b'$ and $c'$, and the knot can be readily untied by pulling upon these ends.

I claim as my invention:—

1. A knot tier embodying a loop-forming member, means rotatable about said member to loop a string thereon, and means coöperative with said member to draw a portion of the string through the loop and to tighten the same when said member is withdrawn therefrom.

2. A knot tier embodying a finger, a gripper movable about said finger to loop a string over said finger, and means coöperative with said finger to draw a portion of the string through the loop and to tighten the loop.

3. A knot tier embodying a loop-forming member, means rotatable about said member to loop a string thereover, and a device carried by said member for gripping a portion of the string and drawing the same through the loop when said member is withdrawn from the loop.

4. A knot tier embodying a reciprocatory loop-forming member, a gripper rotatable about the same and operative to loop a string about said member, and means reciprocable with said member to draw a portion of the string through said loop simultaneously with the withdrawal of said member from the loop.

5. A knot tier embodying coöperative grippers, one rotatable to loop a string about the other and to engage the end of the string therewith, and the other gripper operative to draw the engaged portion of the string through the loop.

6. A knot tier embodying coöperative rotary and reciprocatory grippers, the rotary gripper being operative about the reciprocatory gripper to loop a string thereon and to engage an end of the string therewith, and the reciprocatory gripper operating to withdraw from the loop and to pull the engaged portion of the string therethrough.

7. A knot tier embodying oppositely movable loop-forming members, means movable relatively to said members for looping string ends about both members, and means coöperative with said members to grip and pull said string ends through the loop upon withdrawal of said members therefrom.

8. A knot tier embodying a pair of oppositely reciprocatory grippers, and a pair of grippers rotatable bodily about the reciprocatory grippers to loop string ends thereof and also operative to engage the string ends with the reciprocatory grippers.

9. A knot tier embodying a pair of oppositely movable loop-forming fingers, means for looping string ends thereover, and means coöperative with said fingers for pulling the string ends through the loop during withdrawal of the fingers therefrom.

10. A knot tier embodying a pair of coöperative fingers adapted to be arranged in lapping relation and having grippers arranged at the remote sides thereof, means for looping string ends about said fingers and engaging the same with the respective grippers, and means for withdrawing the fingers from the loop and for drawing the gripped portions of the string ends through the loop.

11. A knot tier embodying a pair of reciprocatory grippers movable into lapping relation, and a pair of grippers rotatable bodily about the reciprocatory grippers to loop string ends thereover and to engage portions of the string ends with the reciprocatory grippers.

12. A device for tying strings embodying a pair of grippers, a pair of loop-forming members, means for operating the grippers to draw the strings taut, means for operating the grippers to loop the strings about said members, means for withdrawing said members from the loop by retracting movements of said members in reverse directions, and means for pulling the strings through the loop to tighten the same.

13. Apparatus for tying the draw strings of articles embodying loop-forming means, gripping means operative to tighten said strings and rotatable around the loop-forming means to loop the same about said loop-forming means, and devices operative to pull the strings through the loop upon withdrawal of the loop-forming means therefrom.

14. Apparatus for tying strings embodying loop-forming means, grippers operative to engage and draw the strings taut and also operative to loop the strings about the loop-forming means, and grippers coöperative with the loop-forming means and operative during withdrawal of the latter from the loop to tighten the loop.

15. Apparatus for tying strings embodying a member movable to and from operative position, grippers operative to engage the strings and draw them taut and then rotatable about said member to loop the strings about said member, and means for tightening the loop to form a knot.

16. Apparatus for tying strings embodying a member movable to and from operative position, a pair of grippers to engage the strings, said grippers being movable away from one another to draw the strings taut and rotatable to loop the strings about said member, means for withdrawing said member from the loop, and means for tightening the loop to form a knot.

17. Apparatus for tying strings embodying a pair of oppositely movable members carrying gripping means and adapted to assume an operative position, a pair of grippers movable into a position to engage the strings and relatively separable to draw such strings taut, such grippers being also rotatable to loop the strings about said members and simultaneously movable into a position to clear said members and subsequently movable into a position to engage the strings with the gripping means of said members, and means for withdrawing said members from the loop to tighten the same.

18. The combination of means for positioning the draw-strings of an article so as to project in opposite directions therefrom, loop-forming means movable to and from a position above the article, a pair of grippers operative to engage the respective strings to draw them taut and to loop them about said loop-forming means, and means for separating the grippers for tightening said loop to form a knot.

19. The combination of means for positioning the draw-strings of an article so as to project in opposite directions therefrom, loop-forming means movable to and from a position adjacent to the article, a rotatable member carrying a pair of pivoted arms embodying grippers, means for operating the grippers to grip and release the strings, means for relatively separating the arms to draw the strings taut, and means for rotating the arms to loop the strings engaged thereby about the loop-forming means, and means for pulling the strings through the loop and thereby tightening the latter to form a knot.

20. The combination of means for positioning the draw-strings of an article so as to project therefrom, a pair of arms having loop-forming fingers and carrying gripping means, means for moving said fingers into adjacent relation to the article and for retracting them, and means operative to loop the strings about said fingers while in adjacent relation to the article and to engage the strings with said gripping means, the latter pulling the strings through the loop and tightening the latter during retraction of said fingers.

21. The combination of means for positioning the draw-strings of an article so as to project therefrom, a pair of oppositely movable arms carrying loop-forming fingers adapted to assume positions in lapped relation adjacent to the article, gripping means carried by said fingers, means for looping the strings about said lapped fingers and for engaging the strings with said gripping means, means for operating said gripping means to engage the strings, and means for withdrawing the fingers from the loop.

22. The combination of means for positioning the draw-strings of an article so as to project therefrom, loop-forming means, and a pair of grippers having means for yieldingly moving them apart to draw said strings taut and operative to loop said strings about the loop-forming member.

23. The combination of means for positioning the strings of an article so as to project therefrom, loop-forming means, and grippers having means for operating them yieldingly to grip the strings, and means for rotating the grippers about the loop-forming means to loop the strings about the loop-forming means.

24. Apparatus for tying the strings of articles embodying, in combination, a set of shafts relatively movable axially, and certain of said shafts being also revoluble, a pair of loop-forming fingers movable to and from operative position above the article, means operative by one of said shafts for effecting such movements, gripping devices carried by said fingers and operative by another of said shafts, a pair of grippers turnable with said revoluble shafts and movable bodily toward and from the article and also movable toward and from one another by relative axial movement between such revoluble shafts, and means for intermittently rotating the revoluble shaft and relatively moving the shafts axially.

25. Apparatus of the character described embodying a gripper, a rotatable gripper operating shaft, a continuously revolving drive shaft having means for intermittently rotating the gripper operating shaft, and a shock absorber for relieving shock incident to the starting of the gripper shaft after each interruption thereof.

In testimony whereof I have hereunto set my hand in presence of two subscribing witnesses.

JOHN T. DALTON.

Witnesses:
JOHN CLAYTON DANEKER,
HENRY W. GRAMLY.